United States Patent [19]

McMurtry

[11] 4,375,723

[45] Mar. 8, 1983

[54] CONTACT-SENSING PROBE

[75] Inventor: David R. McMurtry, Wotton-under-Edge, England

[73] Assignees: Rolls-Royce Limited, London; Renishaw Electrical Ltd., Gloucestershire, both of England

[21] Appl. No.: 276,540

[22] Filed: Jun. 23, 1981

Related U.S. Application Data

[60] Division of Ser. No. 31,150, Apr. 18, 1979, Pat. No. 4,301,338, which is a continuation of Ser. No. 727,616, Sep. 28, 1976, abandoned, which is a continuation-in-part of Ser. No. 550,634, Feb. 18, 1975, abandoned, which is a continuation of Ser. No. 398,831, Sep. 19, 1973, abandoned.

[30] Foreign Application Priority Data

Oct. 4, 1975 [GB] United Kingdom ............... 40718

[51] Int. Cl.³ ............................................. G01B 7/02
[52] U.S. Cl. ................................................. 33/174 L
[58] Field of Search ............ 33/169 R, 172 E, 174 L, 33/174 PC

[56] References Cited

U.S. PATENT DOCUMENTS

| 3,766,653 | 10/1973 | McKay, Sr. | 33/174 L |
|---|---|---|---|
| 4,136,458 | 1/1979 | Bell et al. | 33/174 L |
| 4,153,998 | 5/1979 | McMurtry | 33/174 L |
| 4,155,171 | 5/1979 | McMurtry | 33/174 L |
| 4,177,568 | 12/1979 | Werner et al. | 33/174 L |
| 4,254,554 | 3/1981 | Germano et al. | 33/174 L |
| 4,288,925 | 9/1981 | McMurtry | 33/174 L |

FOREIGN PATENT DOCUMENTS

| 1445977 | 8/1976 | United Kingdom | 33/174 L |
|---|---|---|---|
| 649942 | 2/1979 | U.S.S.R. | 33/169 R |

*Primary Examiner*—Richard R. Stearns
*Attorney, Agent, or Firm*—Stevens, Davis, Miller & Mosher

[57] ABSTRACT

A contact-sensing probe has a movable member including a stylus and is supported on a fixed member at two spaced-apart locations. At each location a spherical element on the one member is situated between convergent surfaces of the other member. A spring urges the movable member into engagement with the fixed member so that at each location the element slides on the convergent surfaces and by virtue of the convergence thereof attains a positive rest position therebetween. The movable member is displaceable from the rest position against the force of the spring when a force is applied to the stylus and is returnable into the rest position by the spring. The elements and surfaces may be electrical contacts, displacement of the stylus being sensed by any one of the contacts being broken. Alternatively displacement is sensed by a proximity sensor.

2 Claims, 13 Drawing Figures

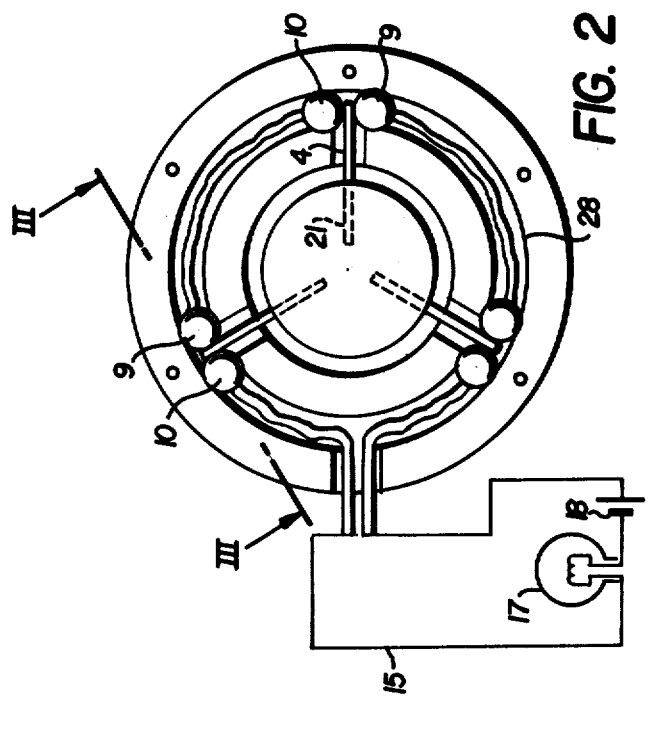
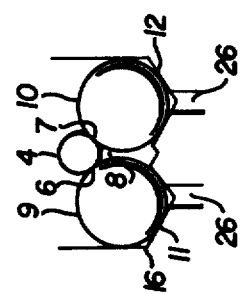
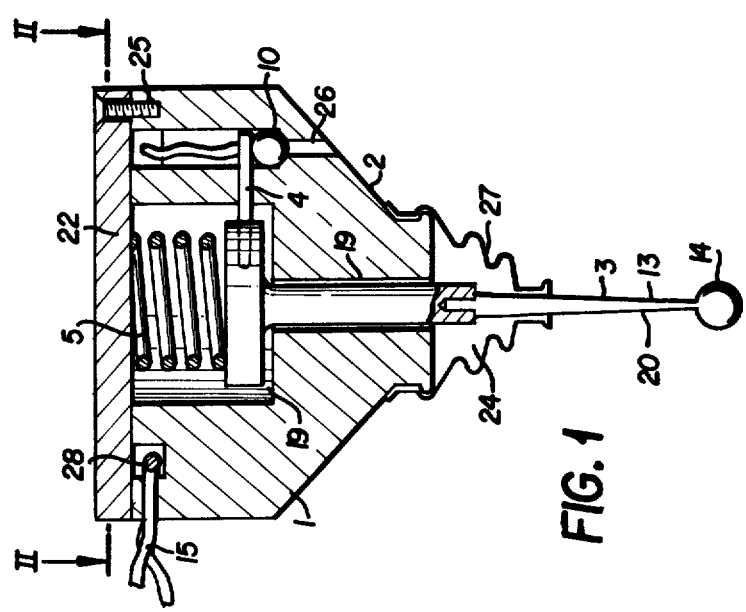

CONTACT-SENSING PROBE

CROSS REFERENCE TO RELATED APPLICATIONS

This is a division of application Ser. No. 31,150 filed Apr. 18, 1979, now U.S. Pat. No. 4,301,338, which is a continuation of application Ser. No. 727,616, filed Sept. 28, 1976, now abandoned, which is a continuation-in-part of application Ser. No. 550,634, filed Feb. 18, 1975, now abandoned, which is a continuation of application Ser. No. 398,831, filed Sept. 19, 1973, now abandoned.

SUMMARY OF THE INVENTION

This invention relates to a contact-sensing probe for use in machines, e.g. inspection machines adapted to signal the co-ordinate position of a stylus when the latter makes contact with a work piece and in this way provide a measurement of the work piece.

Such a probe necessarily comprises a movable member including a stylus and supported for movement on a fixed member, and further comprises a means for sensing a displacement of the movable member relative to the fixed member.

It is an object of this invention to provide a contact-sensing probe wherein the movable member is biased into a positive rest position from which it is displaceable by a force acting on the stylus but into which it can return with a high positional accuracy i.e. a high degree of repeatability of position.

It is also an object of this invention to provide a contact-sensing probe wherein there is only a single movable member thereby to provide simplicity of construction.

It is a further object of the invention to provide a contact-sensing probe which is free from components whose wear could introduce lost motion or could otherwise adversely affect positive location of the movable member in the rest position.

It is yet another object of this invention to provide a contact-sensing probe which combines simplicity of construction with the ability to sense displacement of the stylus in both senses of direction of each of the three dimensions of space.

Other objects will become apparent in the course of the specific description of examples of the invention later herein.

According to this invention a contact-sensing probe comprises a fixed member, a movable member including a stylus and supportable on said fixed member at two spaced-apart locations, at each of said locations one of the members having mutually convergent rigid surfaces and the other one of the members having a locating element engageable between said surfaces, bias means for urging the movable member into engagement with the fixed member, the bias means co-operating with the convergent surfaces so that at each location the locating element tends to slide on the surfaces into a positive rest position thereon, the locating elements and the surfaces co-operating to displace the movable member from the rest position in opposition to the bias means when a force is applied to the stylus, and means for sensing a said displacement.

BRIEF DESCRIPTION OF THE DRAWINGS

Examples of probes according to this invention will now be described with reference to the accompanying drawings wherein:

FIG. 1 is a sectional elevation of a probe according to a first example.
FIG. 2 is a section on the line II—II in FIG. 1.
FIG. 3 is a section on the line III—III in FIG. 2.

DESCRIPTION OF THE PREFERRED EMBODIMENTS

Figure 4:
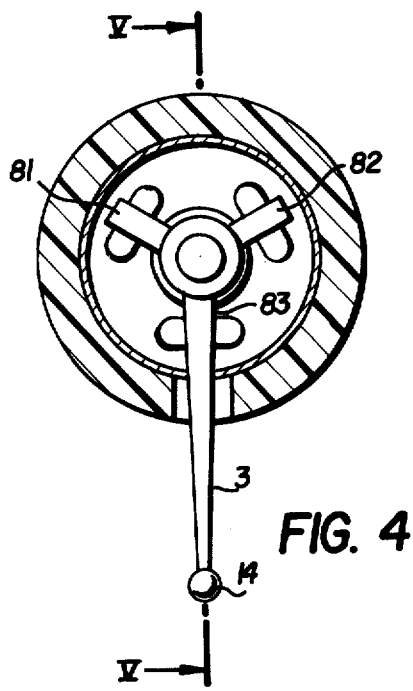
FIG. 4 is a sectional elevation of a probe according to a second example.

Referring to FIGS. 1, 2, 3 a probe 1 comprises a housing 2 and a stylus 3. Three locating elements or arms 4 extend radially out from the stylus which is urged by means of a spring 5 acting on the top 32 of the stylus towards a rest position defined by three locations 8 on the housing. At each location 8 a said arm 4 engages two mutually convergent surfaces 6, 7 formed by a pair of spherical supports 9, 10 sitting in respective drillings 11, 12.

The end 13 of the stylus which extends through the housing terminates in a ball 14, the position of whose geometrical center is accurately known.

In operation the probe is connected to a co-ordinate measuring framework (not shown) for example a rectangular cartesian or spherical polar co-ordinate framework and is movable in space in any direction to sense the boundaries of the object being measured. Contact between the ball 14 and the object displaces the stylus away from its rest position against the force of the spring 5.

The displacement is detected by an electric circuit 15 which is normally completed when the stylus is in its rest position. Each support 9, 10 is electrically insulated from the housing and from the other support in the pair by means of insulation 16. The circuit path passes in series from one location 8 to the next adjacent one, and each arm, which is insulated from the stylus and the other arms, completes the circuit between the two surfaces 6, 7 of each location 8. Displacement of the stylus away from its defined rest position results in at least one of the arms breaking contact with at least one of said surfaces of one of said locations thus breaking the circuit 15 and extinguishing the indicator lamp 17, which is usually lit by the power supply 13.

The breaking of the circuit is used to provide an input pulse to an automatic switching arrangement, not shown but well understood per se, and which may be used as an instruction to a device to read and record the co-ordinates of the probe at that time. It has been found that a pulse of one microsecond duration enables a measurement to be made with great accuracy.

A clearance 19 is provided between the stylus and the housing and this allows limited displacement of the stylus within the housing. Any displacement of the stylus away from the defined rest position is resiliently opposed by compression of the spring 5; thus damage to the stylus due to the inertia of carriages on which the probe is supported may be avoided. If inertia of the carriages is a problem, for example it may prove difficult to prevent bending the shaft 20 of the stylus after a reading has been taken, this can be overcome by providing a known kind of break mechanism into the stylus.

In setting up the probe it is necessary to ensure that each arm 4 makes good contact with each of its respective pair of supports. This can readily be done by mounting the part 21 of each arm that fits into the stylus and coating it with adhesive. The probe is then assembled with the adhesive still soft, and a cover plate 22 which acts as a retainer for the spring 5 is attached by set screws 25. When the adhesive has set and the circuitry is connected to the power supply, lighting of the indicator lamp indicates that the three arms 4 have all bedded in with their respective supports. In this manner the manufacturing tolerances associated with the depth of the drillings 9, 10 in which each support is placed are rendered harmless. To ensure that the geometric center of the ball 14 is in the desired place relative to the probe, provision can be made for attaching the ball and its associated shaft 20 to the stylus after the geometry of the members has been fixed.

The shaft 20 of the stylus is fitted by means of a spigot 24 on the shaft engaging a counterbore. The center of the ball 14 can be aligned with the housing by making the spigot 24 a loose fit in the counterbore in the stylus and adhering them together while the probe and ball 14 are held in an assembly jig.

The drillings for the ball bearings are continued through the housing at a diameter 26 less than that of each ball bearing so that during assembly a faulty ball bearing can be readily removed and replaced.

The shaft of the stylus as illustrated in FIG. 1 is substantially co-axial with the housing but it will be appreciated that this is not necessary to the functioning of the device, for example during cylinder bore measurement it may be preferable for the ball and shaft to lie radially of the illustrated position.

It has been found that the performance of the probe is improved if it is filled with an electrically insulating oil. This prevents sparking at the contacts leading to deterioration thereof. The rubber gaiter 27 prevents the escape of oil along the shaft and is sufficiently flexible so as not to interfere with the resting of the probe in its defined rest position.

The electrical connections between the locations 8 may conveniently lie in an annular groove 28 in the housing. It will be appreciated that the use of spherical supports to form the convergent surfaces 6, 7 is merely for convenience and that each pair of such surfaces could for instance be replaced with a pair of cylindrical supports inclined together. It will be clear that the contacting surfaces of the locating elements and the support elements are mutually convex.

In this embodiment it will be understood that the rest position of the stylus is defined by, and movement from this rest position is detected by, the same means.

Figure 5:
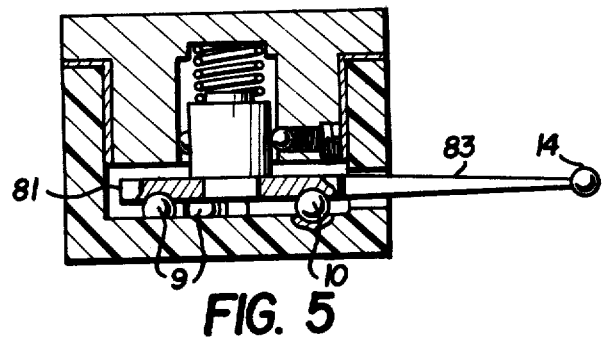
FIG. 5 is a section on the line V—V in FIG. 4.

In FIGS. 4 and 5 the stylus has three generally circular legs 81, 82 and 83 each of which co-operates with locations formed as described with reference to FIGS. 1, 2, and 3. One of the three legs 83 is extended to define the stylus and carries the ball 14 for contact sensing. This particular embodiment may have advantages in certain circumstances for example for the measuring of cylinder bores.

Figure 7:
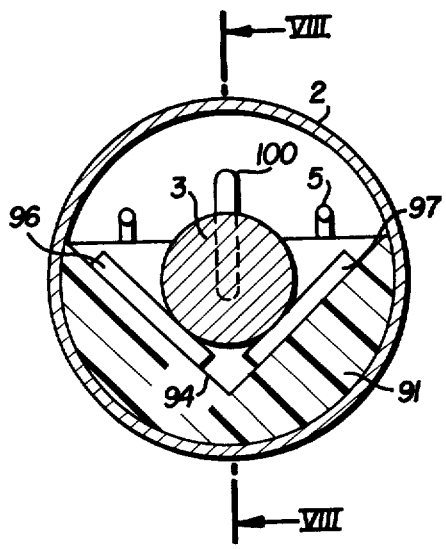
FIG. 7 is an enlarged section on the line VII—VII in FIG. 6.
Figure 8:
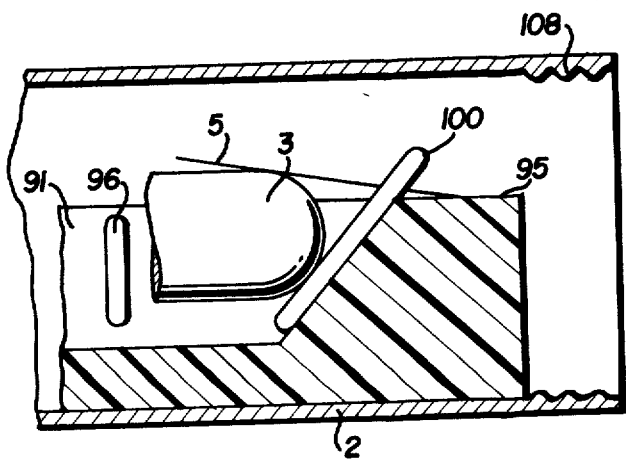
FIG. 8 is a section on the line VIII—VIII in FIG. 7.
Figure 6:
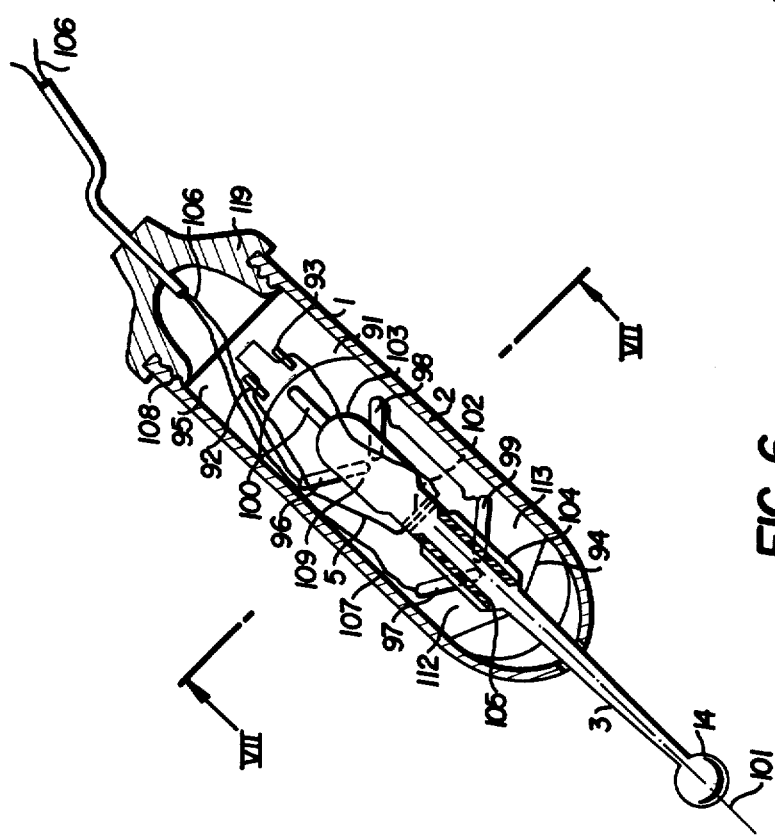
FIG. 6 is a perspective view of a probe according to a third example.

Referring to FIGS. 6, 7, 8 a probe 1 comprises a stylus 3 located within a housing 2. A hairpin spring 5 is secured at one end to a dielectric body 91 by means of two straps 92 and 93 bonded into the dielectric body. The dielectric body further illustrated in FIGS. 6 and 7 is generally semi-cylindrical with a V-shaped groove 94 extending over most of its length and a platform portion 95 to which the straps 92 and 93 are bonded. The dielectric body which is made in a polyester resin is bonded with further polyester resin into the housing 2. At two spaced apart locations respective pairs 96, 98 and 97, 99 of cylindrical supports are bonded to the sides 112, 113 respectively of the V-shaped groove 94 to form convergent surfaces and at a third location a cylindrical support 100 is bonded to the dielectric body so as to subtend an angle of about b 45° with the axis 101 of the probe 1.

In operation the spring 5 which passes through a diametral holo 102 in the stylus, urges two locating elements constituted by longitudinally spaced cylindrical portions 104, 109 of the stylus into contact with the convergent surfaces, and the curved end 103 into contact with the inclined surface of the support 100 thus defining a rest position for the stylus. Contact bewteen the ball 14 at the end of the stylus and an object to be measured deflects the stylus changing its orientation relative to the housing 2 and causing it to move away from at least one of the supports. Thus by providing an electric circuit between the supports and the stylus the movement of the stylus away from its rest position can be determined, each point of contact between the stylus and the supports acting as a switch for making or breaking the electric circuit. All the five supports 96–100 are bonded to the dielectric body with polyester resin and are physically separated and hence electrically insulated from each other. The cylindrical portion 104 is insulated from the remainder of the stylus by a cylindrical sleeve 105 of polyester resin.

The electric circuit for determining when the stylus breaks contact with one of the supports is connected from the wire 106 via the support 96, the stylus 3, the support 98, the support 99, the cylinrical portion 104 of the stylus, the support 97 and the wire 107 in series with a power supply and an indicating lamp (not shown).

The two wires 106 and 107 are mechanically supported relative to the probe by a rubber cap 119 which connects to the probe by a screw thread 108.

There is no need for an electrical connection to be made between the fifth support 100 and the stylus as any axial movement of the stylus causes its spherical end 103 to co-operate with the inclined needle roller 100 and thus break the electrical connection between one of the other needle rollers and the stylus.

It will be readily appreciated that although, in this embodiment, it is convenient to use cylindrical supports to define a pair of V-shaped slots for locating the stylus in its rest position, other methods of location may be used. For example each cylindrical support could be replaced by a rectangular metallic strip. Cylindrical supports are preferred as they are readily commercially available and have a high standard of surface finish and hardness thus yielding low fricitional forces to resist movement of the stylus and improving the sensitivity of the probe. The invention contemplates that any means of ensuring a definite rest position for the stylus may be substituted for the cylindrical supports and that the present point contact between the stylus and each support may be replaced by a line contact.

In a modificatin (not shown) the fifth support 100 is set perpendicular to the axis 101 of the probe whereby only the two portions 104, 109 are supported by convergent surfaces and the capability of the probe is restricted to two dimensions.

Figure 9:
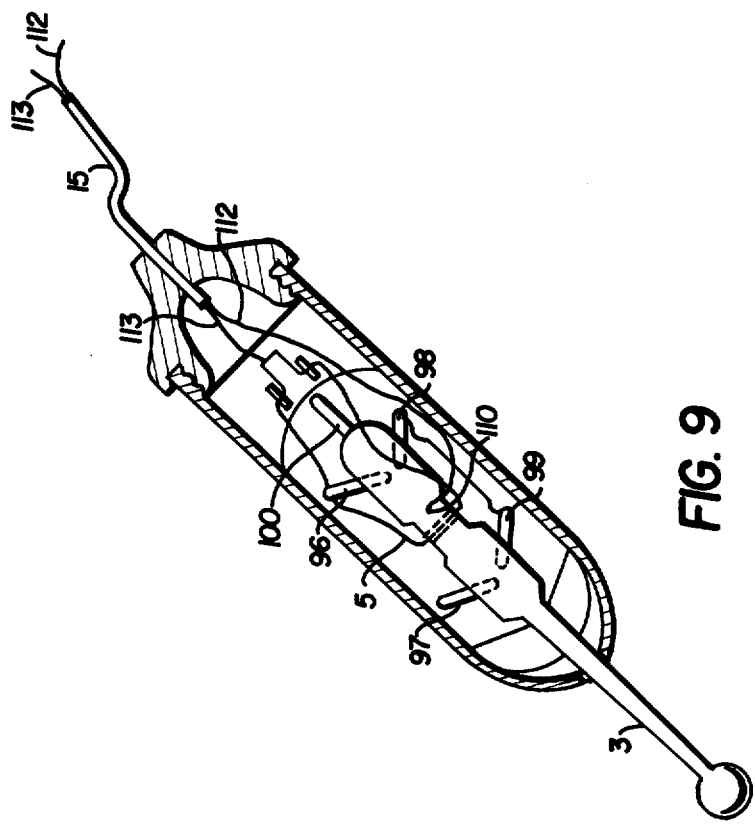
FIG. 9 is a perspective view of a probe according to a fourth example.

In an alternative embodiment illustrated in FIG. 9 the same disposition of supports 96–100 is adopted as in FIG. 6 but their function, in combination with the spring 5 is purely to locate the stylus in its rest position. An electrical circuit 15, is then completed by way of the wire 112, a switch terminal 110, the stylus 3, the hairpin spring 5 and the wire 113. Any movement of the stylus away from its rest position will result in the switch formed between the stylus 3 and the terminal 110 being broken and hence said displacement can be detected via the electrical circuit 15.

During measuring of an object with any of the aforementioned embodiment a series of readings are taken at various positions about the object to produce information which may readily form the input data for a computer programmed to compare the object with a master object. Thus probes according to the invention may be used for measuring such objects as pipes for gas turbine engines and cylinder blocks for internal combustion engines.

The probes herein described have been provided with a detector comprising an electrical switching system but it will be appreciated that th electrical switching system could be replaced by fluidic or other known switches and that the detector may comprise means other than a switch. In one embodiment a detector may comprise an optical projection system for magnifying a mismatch between two pointers, the mismatch providing an indication of movement of the stylus.

It will be further appreciated that any of the above embodiments may be filled with oil in a similar manner to that desribed with reference to FIGS. 1, 2, and 3.

Conveniently, the cylindrical portions 104, 109 (FIG. 6) define surfaces of revolution concentric about the axis 101 and linear in the direction of the axis 101. The stylus 3 is therefore movable axially, except insofar as limited by the support100. Axial movement away from the support is, in this case, not detected. Nevertheless, the examples of FIGS. 6 and 9 present economical constructions suitable for many applications. However, in cases where it is undesirable to use electrical contacts, for detection of stylus displacement, or where such displacement has to be detectable in each sense of the three dimensions of space, the next-following example is appropriate.

Figure 10:
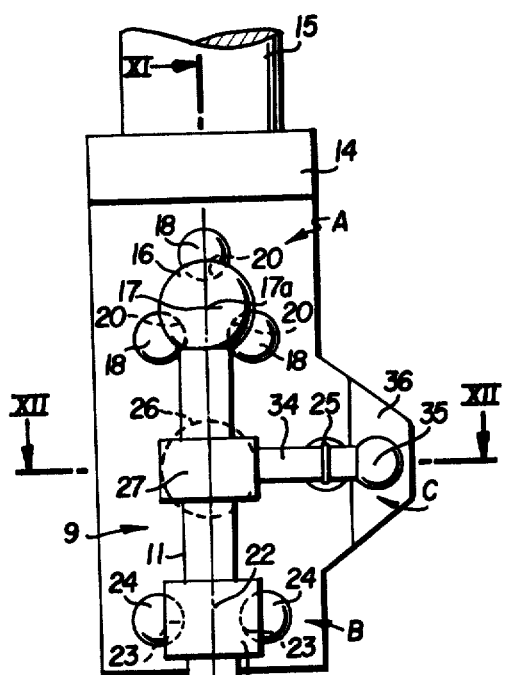
FIG. 10 is an elevation of a probe according to a fifth example.
Figure 11:
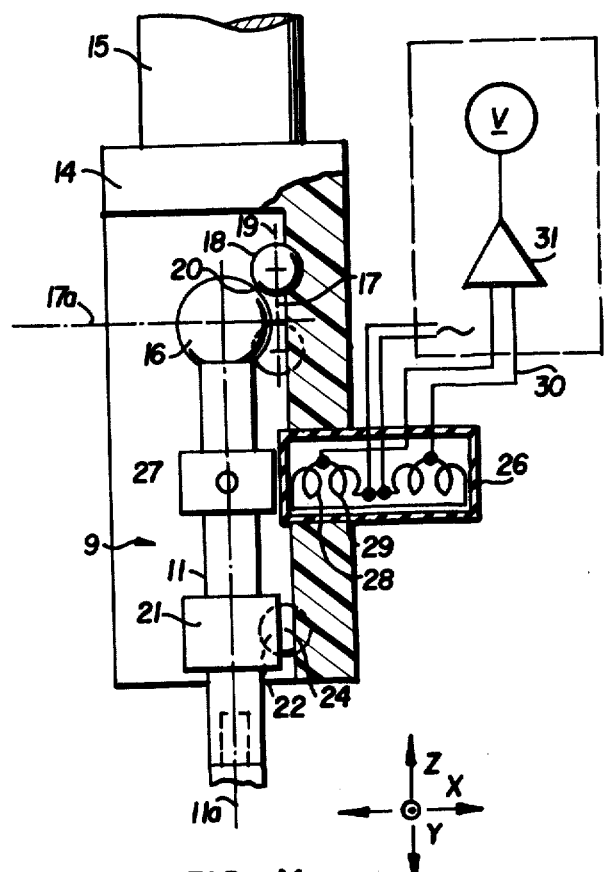
FIG. 11 is a section on the line XI—XI in FIG. 10.
Figure 12:
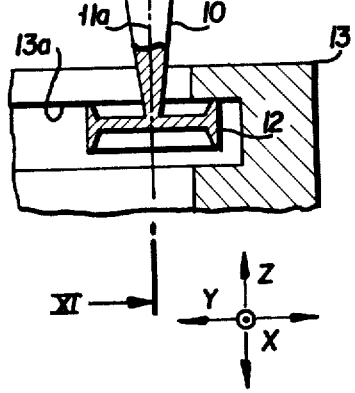
FIG. 12 is a section on the line XII—XII in FIG. 10.

Referring to FIGS. 10-12, a movable member 9 comprises a stylus 10 connected to a rod-shaped body 11 elongate along an axis 11a normally extending in the direction of the co-ordinate dimension Z. The stylus has at the free or sensing end thereof a disc 12 whereby to contact a work piece 13. The body 11 is supported in a housing 14 provided with a spigot 15 for fixed attachment to the head of a measuring machine (not shown) supporting the probe for three-dimensional movement relative to the work piece.

The member 9 is supported in the housing 14 at two locations A, B spaced apart along the axis 11a. At location A the member 9 embodies a spherical element 16 engaging an axi-symmetric recess 17 constituted by mutually convergent surface 20 of three equi-spaced balls 18 secured to the housing. The centers of the balls lie in a plane 19 extending in the Y and Z dimensions so that the axis of symmetry 17a of the recess 17 is perpendicular to the axis 11a. Thereby the element 16 is constrained by the recess 17 to permit pivotal movement about the axis 17a but restrains movement in the Y-Z plane.

At location B the member 9 has a cylindrical element 21 concentric with the axis 11a and engaging a recess 22 constituted by mutually convergent surfaces 23 of two balls 24 whose centers lie in the plane 19 on a line perpendicular to the axis 17a. The surfaces 23 allow movement for the cylindrical element 21 in th Z direction by resist rotation of the stylus in the Y-Z plane about the center of the ball 16.

The member 9 is biased into engagement with the balls 18, 24 by a spring 25 arranged between the housing 14 and the body 11 in a position intermediate between the locations A, B. When engaged with all five balls 18, 24 the member is said to be in a rest position and it is positively retained in that position by the bias created by the force of the spring and the convergence of the ball surfaces which bias urges the elements 16, 21 down into the lowest possible in the recesses 17, 22. As will be explained, the member 9 is displaceable from the rest position in opposition to the force of the spring by a force applied to the disc 12 by engagement thereof with the work piece and the member 9 will be returned to the rest position by said bias on cessation of the latter force.

Any movement of the member 9 relative to the housing 14 is detectable by a metal proximity sensor 26 provided in a resin part of the housing. For the purpose of detecting such movement use is made of the fact that movement of the disc 12 in any of the dimensions X, Y, Z must result in tilting of the member 9 such that axis 11a thereof moves out of parallelism with the Y-Z plane. thus, movement in the Y direction causes the cylindrical part 21 to slide up one or other of the surface 23 and so pivot member 9 about the axis 17a and out of the Y-Z plane. Similary movement in the Z direction causes the ball 16 to slide up at least one of the three balls 18 and tilt the member 9 on the balls 24. Movement in the X direction causes the member 9 to rock on the balls 18 or the balls 24. Any of these movements is effectively detectable at a portion 27 of the body 11 substantially medially between the locations A, B and the sensor 26 is mounted accordingly in a position adjacent the portion 27 and such as to detect movement thereof perpendicular to the Y-Z plane.

It will be seen that movement in any of the direction X, Y, Z may take place in either sense of direction. For example, movement of the disc 12 in the Z direction may take place towards or away from the housing. The latter situation applies when the machine is used to raise the disc 12 against an undercut surface 13a of the work piece.

When, after contact with the work piece, the probe is moved so that contact with the work piece is disestablished and the force on the disc 12 ceases, the bias created by the spring and the convergent surfaces causes the elements 16, 21 to slide back into the lowest position in the recesses 17, 22 so that the member 9 is returned to the rest position.

To ensure good sliding action and high repeatability in attaining the rest position the elements 16, 22 and the balls 18, 24 are made of hardened and polished steel.

Commercial ball bearing finishes are usually sufficient for this purpose.

The sensor 26 is known per se as comprising for example a pair of electro-magnetic induction coils 28, 29 connected in a bridge circuit 30 such that a change in the reactance of one of the coils, as may be produced by a change of position of the stylus, varies the bridge output, e.g., away from zero. The bridge output is taken through an amplifier 31 to a suitable indicating means, e.g. a volt meter.

The measuring machine referred to is known per se and generally comprises a head supported by carriages movable respectively in the X, Y and Z direction respectively. The carriages are provided with means for measuring the co-ordinate position of the head and thus of the probe attached thereto. A work piece is measured by measuring the position of the head at the instant when, on contact between the disc 12 and the work piece 13, the output of the sensor 25 changes.

Figure 13:
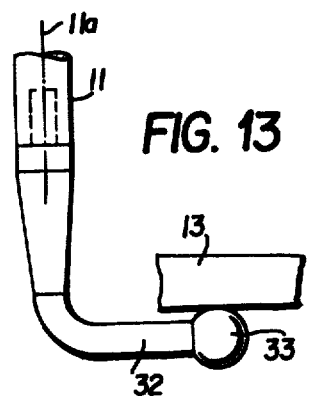
FIG. 13 is a modified detail of FIG. 10.

It will be clear that in the absence of provision to the contrary the member 9 is rotatable about the axis 11a. This is no disadvantage because if the sensing end of the stylus is rotationally symmetrical about the axis 11a, e.g. as in the case of the disc 12, the angular position of the member 9 about the latter axis is immaterial. However if the sensing end of the stylus is laterally off-set from the axis 11a, as shown by a lateral arm 32 and spherical end 33, (FIG. 13) the need arises for inhibiting rotation of the member 9 about the axis 11a.

As shown in FIGS. 10 and 12 the member 9 has secured thereto a lateral arm 34 the free end 35 of which is provided with a convex surface resting at a location C, on a flat surface 36 on the housing 14. The spring 25 is connected between the arm 34 and the housing in a position relatively closer to the end 35 than the axis 11a because the bias pressure required at the locations A, B is smaller than at the location C. However, separate springs may be provided at the location C and directly intermediate between the locations A, B.

The term "axisymmetric recess" used herein is intended to include a conical recess which may be used instead of the recess formed by the balls 18. At each location A or B the recess 17 or 23 may be provided on either one of the members 9,14, the element being provided on the corresponding other one of the members 9,14. Instead of the one sensor 26 shown, two such sensors may be provided respectively adjacent the locations A, B.

Referring further to FIGS. 10 and 11, the convergent surfaces 20,23 of the fixed member 14 may be termed "first surfaces" and the regions of the movable member 9 engageable with the surfaces 20,23 in the rest position of the movable member may be termed "second surfaces" which are slidable on the first surfaces.

To ensure point contact, or at least line contact, between a first and second surface they must be mutually convex. This condition is satisfied if both surfaces are convex or one is flat while the other is convex.

We claim:

1. A device for mounting a stylus in position-determining apparatus wherein said device and an object are movable relative to each other for providing a signal when said stylus engages said object thereby indicating the position thereof, said device comprising:
   a fixed member;
   a movable member to which said stylus is connectable and which is supportable on said fixed member at three locations arranged in a plane and at the three corners of a triangle, said members respectively defining at each said location, a supported element and a supporting element confronting the supported element in a direction perpedincular to said plane, at a first said location one of said elements having surface means defining an axisymmetric recess covergent in said direction and the other element being engageable with said recess;
   at a second said location one of said elements having second surface means defining a pair of surfaces convergent in said direction and the other element being engageable with said pair of surfaces;
   one of the second surface means and the element engageable therewith being shaped to define an axis extending in a direction including the first and second locations;
   at the third said location one of the elements having third surface means defining a flat surface parallel to said plane and the other element being engageable with said flat surface, bias means for urging the movable member into contact with the fixed member; and
   said first, second and third surface means co-operating under the force of the bias means to locate the movable member in a positive rest position on the fixed member, the movable member being removable from the rest position in opposition to the bias means when a force is applied to said stylus and being retrunable to the rest position by said means and surface means on cessation of said force.

2. A device according to claim 1 wherein said stylus extends in a direction parallel to said plane.

* * * * *